United States Patent [19]
Otsuka

[11] Patent Number: 5,765,778
[45] Date of Patent: Jun. 16, 1998

[54] FLIGHT VEHICLE WITH A SAFETY DEVICE

[76] Inventor: Ayako Otsuka, 1238-4, Oaza Miyoshi, Oita-shi, Oita-ken, Japan

[21] Appl. No.: 632,599

[22] Filed: Apr. 15, 1996

[51] Int. Cl.⁶ .......... B64C 25/56; B64C 15/12; B64D 25/18; B64D 45/06
[52] U.S. Cl. .......... 244/101; 244/12.5; 244/17.17; 244/23 D; 244/100 A; 244/107; 244/139
[58] Field of Search .......... 244/12.5, 17.15, 244/17.17, 17.19, 23 B, 23 D, 100 A, 101, 105, 107, 121, 139, 110 B, 63

[56] References Cited

U.S. PATENT DOCUMENTS

| | | | |
|---|---|---|---|
| 2,926,868 | 3/1960 | Taylor | 244/52 |
| 2,971,725 | 2/1961 | Jakimiuk | 244/63 |
| 3,990,658 | 11/1976 | Letsinger | 244/100 A |
| 4,676,457 | 6/1987 | Allen | 244/17.15 |
| 5,259,574 | 11/1993 | Carrot | 244/100 A |
| 5,560,568 | 10/1996 | Schmittle | 244/139 |
| 5,622,133 | 4/1997 | Sinitsyn et al. | 244/100 A |

FOREIGN PATENT DOCUMENTS 1511170   9/1989   U.S.S.R. ............ 244/100 A

*Primary Examiner*—Virna Lissi Mojica
*Attorney, Agent, or Firm*—Wenderoth, Lind & Ponack

[57] ABSTRACT

An aircraft which is capable of safely landing during an emergency landing is disclosed. The aircraft has a safety device which includes a plurality of auxiliary engines. Each auxiliary engine is movable so as to vary the thrust axis in a range between a substantially horizontal direction and a substantially vertical direction. The safety device also includes a plurality of gas bags contracted and disposed at a lower portion of the aircraft body so as to be instantly expandable at a necessary time, such as during an emergency landing.

6 Claims, 4 Drawing Sheets

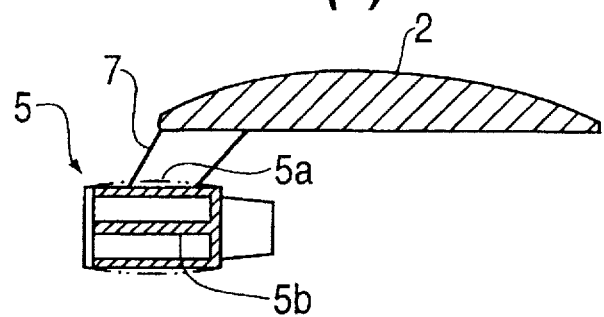
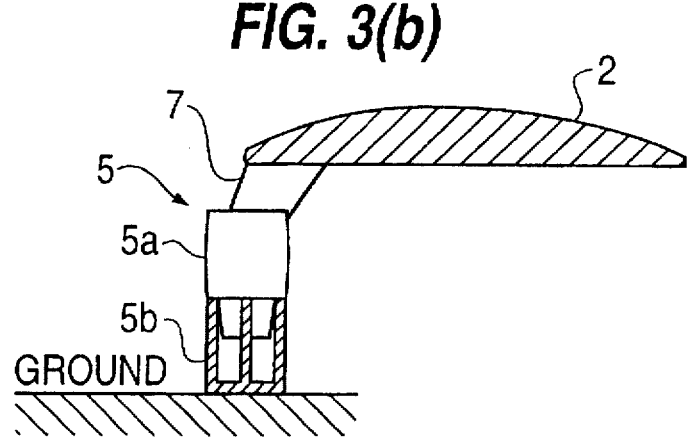

FLIGHT VEHICLE WITH A SAFETY DEVICE

BACKGROUND OF THE INVENTION

1. Field of the Invention

The present invention relates to a flight vehicle, such as an airplane or a helicopter, having a safety device which enables a safe landing at the time of an emergency landing (including a water landing) such as a forced landing.

2. Description of the Prior Art

Heretofore, as a countermeasure in an emergency situation like a forced landing occurring with an airplane, there is an idea as one example that a large type of parachute, folded and contained in the upper part of the airplane fuselage, can be discharged and opened in the event of an emergency, and the airplane can safely land at a slow speed.

As for a countermeasure for an emergency case like a forced landing occurring with a helicopter, as the helicopter flies at a comparatively slow speed and its main objective is an activity near the ground, such as low altitude flying, vertically ascending and descending, and hovering near the ground, at present there is no specific countermeasure.

In other words, as the helicopter is of a construction that it can land anywhere if there is a small level area, as compared with a fixed-wing aircraft, it can be said that not much attention is paid to forced landings and the potential countermeasures are ignored.

With the conventional countermeasures for a forced landings of an airplane, there are the following shortcomings:

In the conventional devices which employ a large type of parachute, if an accident occurs immediately before a landing for example, even if the parachute is discharged, it requires a long time and a high altitude until the suspending ropes sufficiently elongate and the parachute opens completely. Thus, when time is limited or at low altitudes such as when approaching a landing, the conventional device is of no use. Even if a landing does takes place by use of the parachute, there is a disadvantage that damage to the airplane body will be unavoidable.

Further, in the conventional helicopter, in a situation where it falls due to touching an electrical transmission line, a building on the ground, a cliff, or by making contact with another aircraft while flying for photographing and news collecting of a ground accident, the helicopter, having no fixed-wing (main wing), may immediately fall or, fall with a total loss of balance. Especially in recent years, there are several instances of accidents of news collecting aircraft or privately owned aircraft.

SUMMARY OF INVENTION

It is therefore a first object of the present invention to provide an airplane which solves the above-described shortcomings in the prior art and enables a safe landing at the time of forced landing.

For attaining the object, the present invention discloses an airplane with a safety device which includes an auxiliary engine having a thrust axis which is movable in the range between a substantially horizontal direction and a substantially vertical direction and a gas bag contracted and contained in an appropriate place in the lower portion of the airplane so that is can be expanded instantly at a necessary time of an emergency landing and will absorb landing shock of the airplane. The present invention also discloses a means in which the auxiliary engine has an engine guard for shock absorbing and is projectable in a direction along the thrust axis.

Further, it is a second object of the present invention to provide a helicopter which solves the above-described shortcomings in the prior art and enables a safe landing (including landing on the water).

For attaining the objects, the present invention discloses a helicopter with a safety device including an auxiliary engine having a thrust axis movable in a range between a substantially horizontal direction and a substantially vertical direction and a gas bag contracted and contained in an appropriate place in a lower portion of the helicopter so that it is expanded instantly at a necessary time of any emergency landing and will absorb landing shock of the helicopter. The present invention also discloses a means in which the auxiliary engine of a helicopter with a safety device comprises an engine guard for shock absorption and is projectable in a direction along the thrust axis.

In the above description, the expression "the range between the substantially horizontal direction and the substantially vertical direction" means not only the range within the plane including the aircraft axis (longitudinal axis) but also the range in the vertical directions in all directions including the axis of the right and left direction (lateral axis), and more concretely, in case of the thrust direction of the auxiliary engine (forward direction) being directed upwardly, it means that the thrust axis can draw a conical shape around the fulcrum and also that the thrust axis can select any direction within the conical shape.

Further, the word "contracted" with respect to the gas bag includes, needless to mention a state of being analogously contracted, a state of being folded with the surface area of the expanded state being unchanged and the inner gas being taken out.

Further, a gas used for the gas bag may be air, a nitrogen gas, a combustion gas, an explosion gas of high explosive, or every other gas appropriate for the object.

Further, the thrust, as used above, includes a propeller thrust etc., needless to mention a jet thrust.

The airplane with the safety device functions as follows. That is, as the airplane has an auxiliary engine, the thrust axis of which is movable in the range between the substantially horizontal direction and the substantially vertical direction, in an emergency case where a forced landing is unavoidable, the thrust axis of the auxiliary engine is directed upwardly (the direction of the airplane being moved upwardly), or in some case up- and the backwardly for reducing the airplane speed to effect a rapid reduction of the airplane descending or sinking, or further according to circumstances up- and the leftwardly, up- and rightwardly or to an appropriate front or back direction for landing at a slow speed or at a desired place, thus the safety of human lives can be secured.

Further, as the airplane includes a gas bad contracted and contained in an appropriate place at a lower portion of the airplane so that it is expanded instantly at a necessary time during an emergency landing etc. and absorbs landing shocks of the airplane, in case of an emergency landing including a forced landing, the gas bag, used jointly with the auxiliary engine, is instantly expanded and projected downwardly to provide a cushion, thereby the landing shocks can be absorbed and the safety of human lives can be further secured and the damage to the airplane can be reduced.

Further, since the auxiliary engine of an airplane with a safety device includes an engine guard for shock absorbing, the engine guard surrounding the auxiliary engine, with a plurality of bar elements disposed projectably in the axial direction for example, in the case of a landing while the auxiliary engine is operating, the engine guard projects from the engine end portion and absorbs landing shock, thus the engine is protected against damages.

Next, the helicopter with the safety device functions as follows. That is, since the helicopter includes an auxiliary engine, the thrust axis of which is movable in the range between a substantially horizontal direction and a substantially vertical direction, in an emergency case where a forced landing is unavoidable due to rotor damage, tail unit damage, etc., the thrust axis is directed upwardly (the direction of the helicopter being moved upwardly), or in some case the thrust axis is inclined to a necessary direction relative to the vertical direction for reducing the plane moving speed, such as the forward speed etc., or for moving the helicopter to a desired place, or further in case of the tail unit being damaged (accordingly the tail rotor also) and the helicopter rotating within a plane, etc., by use of the auxiliary engine previously provided out of the center of gravity, the thrust axis is inclined in a direction so as to offset the rotational moment and the helicopter can make a landing at a desired place at a slow speed, thus safety of human lives can be secured.

Further, the helicopter includes a gas bag, contracted and contained, in an appropriate place at a lower portion of the helicopter so that it can be expanded instantly at a necessary time of an emergency landing. The gas bag absorbs landing shock of the helicopter, and in the case of an emergency landing including a forced landing, the gas bag, used jointly with the auxiliary engine, can be instantly expanded and projected downwardly so as to provide a cushion. Thereby the landing shock can be absorbed and safety of human lives can be further secured and the helicopter also can be saved from damage.

Further, as the auxiliary engine of a helicopter with a safety device including an engine guard for shock absorbing, the engine guard being disposed so as to surround the auxiliary engine, with a plurality of bar elements disposed projectably in the axial direction for example, in case of a landing while the auxiliary engine operates, the engine guard projects from the engine end portion and absorbs landing shock, thus the engine is protected against damage.

Incidentally, in the airplane or helicopter with the safety device, as a high speed landing on water results in damage, not much differently from landing on the ground, to human lives or to the aircraft body, the same operation as in the case of landing on the ground can be taken also in the case of landing on the water. Hereinafter, "landing" includes a case of landing on the water, as the case may be, and "landing on the water" is not specifically referred to, except where necessary.

The thrust axis of the auxiliary engine of the airplane or helicopter with the safety device is directed, while in normal flight, in the direction of flying, and the main reason for that is a reduction of air resistance. Whether the auxiliary engine is used as an engine during normal flight or not, is optional.

The airplane or helicopter provided with the safety device, as constructed above, have the following effects. That is, as it includes an auxiliary engine, the thrust axis of which is movable in the range between the horizontal direction and the vertical direction, in a case of a forced landing, the auxiliary engine is directed upwardly allowing the aircraft to make a slow landing, thus safety of human lives can be secured.

Further, as the auxiliary engine is movable, its thrust axis can be moved in the range between the substantially horizontal direction and the substantially vertical direction. Even in a case where the usual operation system is out of the order, the direction of the upward thrust is adjusted appropriately so that a horizontal speed component can be given and thereby the aircraft can be led to and landed at a desired safe place.

Further, as the instantly expandable gas bag is disposed at an appropriate place at the lower portion of the aircraft, it can be expanded to absorb landing shock, thereby the aircraft can make a further safe landing and not only human lives but also the aircraft can be recovered in a sound state.

Furthermore, in an emergency water landing, the gas bag becomes a floating body to float the aircraft and both human lives and the aircraft can be protected without sinking in the water.

BRIEF DESCRIPTION OF THE DRAWINGS

FIGS. 3(a)–3(b) are sectional views taken along line A—A in the direction of arrows of FIG. 1, wherein FIG. 3(a) is a view showing an auxiliary engine in a substantially horizontal position, and FIG. 3(b) is a view showing the auxiliary engine in an upwardly direction position;

FIGS. 5(a)–5(b) are enlarged schematic side views showing an auxiliary engine of FIG. 4, wherein FIG. 5(a) shows the auxiliary engine in a substantially horizontal position and FIG. 5(b) shows the auxiliary engine in an upwardly directed position and an engine guard projected.

DESCRIPTION OF THE PREFERRED EMBODIMENTS

Figure 1:
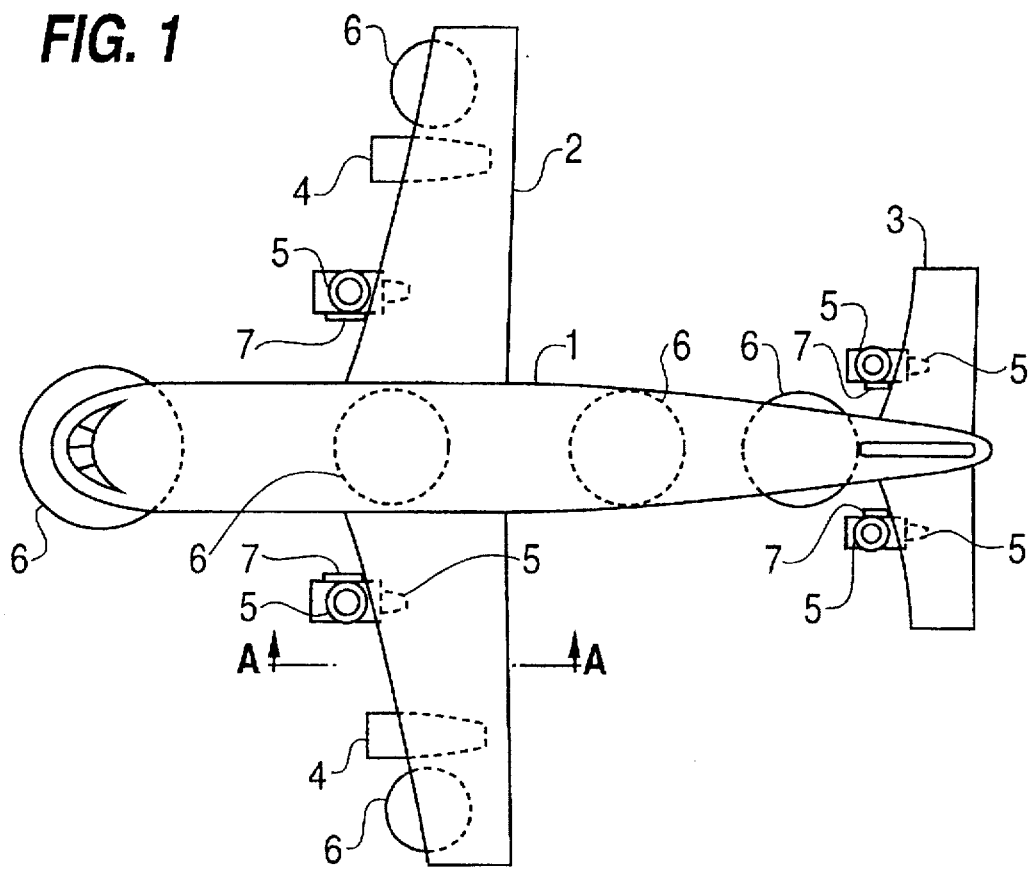
FIG. 1 is a plan view of an airplane equipped with a safety device of a first preferred embodiment according to the present invention.
Figure 2:
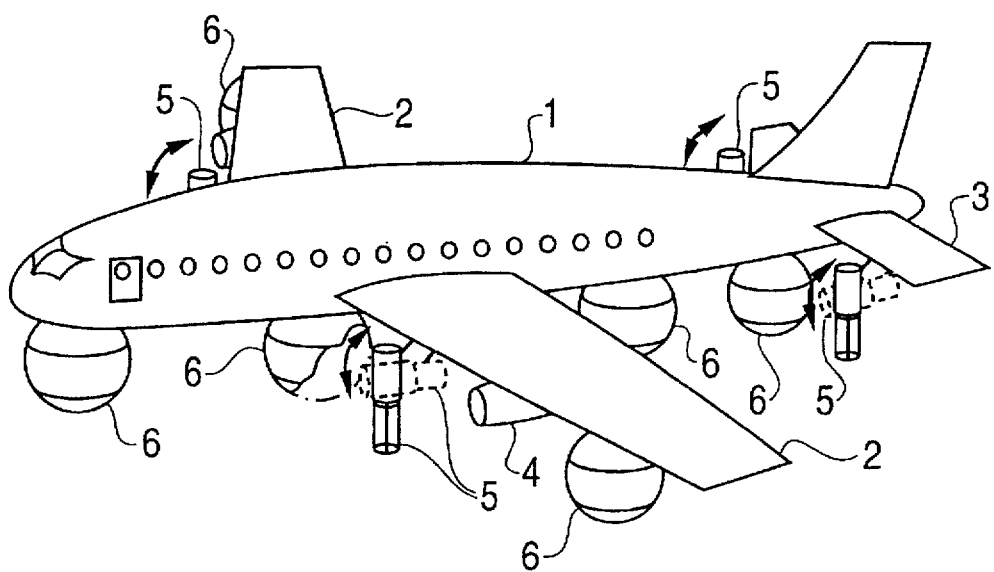
FIG. 2 is a perspective view of the airplane equipped with the safety device of the first preferred embodiment.

A first preferred embodiment according to the present invention is described with reference to FIGS. 1 to 3. FIG. 1 is a plan view of an airplane with a safety device of the first preferred embodiment. FIG. 2 is perspective view thereof, and FIGS. 3(a)–3(b) are sectional views taken along the line A—A in the direction of arrows of FIG. 1. FIG. 3(a) is a view showing an auxiliary engine 5 in a substantially horizontal orientation and an engine guard 5b (a nacelle cover 5a is shown with two dotted and dash lines), and FIG. 3(b) is a view showing the auxiliary engine in a substantially vertical orientation (vertical direction) and the engine guard 5b in a projected position.

Incidentally, FIGS. 1 and 2 show a state of an emergency landing, that is, the auxiliary engine 5 is directed upwardly and an air bag 6 is deployed or expanded (projected). Also, the arrows of FIG. 2 show that the auxiliary engine 5 is rotatably movable in the directions of arrows in a range between a substantially horizontal direction and a substantially vertical direction. In the figure, the horizontal state (forward direction) of the auxiliary engine 5 is shown by two dotted and dash lines.

In FIGS. 1 and 2, numeral 1 designates an airplane fuselage, numeral 2 designates a main wing, numeral 3 designates a tail unit, numeral 4 designates a main engine for usual flight, and numeral 5 designates an auxiliary engine which is directed forwardly at the time of normal flight for reduction of air resistance and, in an emergency situation where a forced landing is unavoidable, rotates to the upward direction and generates an upward thrust. Numeral 6 designates an air bag folded and contained at a usual time inside the outer shell of the lower portion of the fuselage 1 or the main wing 2, wherein an air inlet side thereof is connected to the airplane body and further to a high pressure air bomb (not shown) which opens at an indication (operation) of a pilot in an emergency situation that the air bag expands like a ball as shown in the figure by the high pressure air and absorbs the landing shock of the airplane. Numeral 7 designates a supporting member projecting downwardly from a portion near the fuselage 1 of the main wing 2 or from the tail unit 3 for rotatably and fixedly supporting the auxiliary engine 5. Incidentally, all these components are disposed right and left symmetrically relative to the airplane body, and the outer shell of the portion which contains the air bag 6 is constructed so as to open in response to the ejecting pressure of the air bag 6 outwardly so as to pivot about a hinge. The portion of the outer shell may also be an independently formed detachable cover.

Next, the FIGS. 3(a)–3(b), numeral 5a designates a nacelle cover of the auxiliary engine 5, and between the nacelle cover 5a and the auxiliary engine 5, there is formed a space in which an engine guard 5b is projectably disposed. The engine guard 5b is used for shock absorption and for protecting the upwardly directed auxiliary engine 5 against damages at the time of a forced landing. The engine guard is formed of a plurality of bar elements which are disposed along the thrust axis of the auxiliary engine 5 so as to surround the body of the auxiliary engine 5. The engine guard 5b is also projectable in the axial direction, and the rear ends of the bar elements (the lower end side at the time of landing) are connected fixedly to an annular element. The engine guard 5b is usually contained between the nacelle cover 5a and the body of the auxiliary engine 5, and automatically responds to upward rotational movement of the auxiliary engine 5, by an operation of a pilot immediately before landing, or automatically upon detecting a ground approaching effect such as an increase of backpressure against jetting pressure. As shown in FIG. 3(b), the guard projects or elongates beyond the tail end of the auxiliary engine 5, and touches the ground and absorbs shocks by forming an elastic projection. Thereby the auxiliary engine 5 does not touch the ground and is protected against damage.

The method of projection of the engine guard 5b can be taken, for example, from a compressed spring method in which a spring is inserted into a long and slender cylindrical element and a long bar element is inserted therein, a pneumatic method using a combination of a long and slender cylinder and a piston, or a rack and pinon method in which a rack is provided on the side of a bar element and a pinion to be rotated by an oil motor, reversely rotatable at a predetermined force, is provided on the side of the auxiliary engine 5. Whether the engine guard 5b is to be provided or not, however, is optional, and if there is no need to protect the auxiliary engines in an emergency landing etc., it will not be necessary.

Next, a function of the first preferred embodiment as so constructed is described.

During normal flight of the airplane, the auxiliary engine 5 is oriented parallel to the airplane axis and joins in the flying thrust with a forward thrust. The auxiliary engine is not necessarily used during normal flight but, needless to mention, to use it together with the main engines is more efficient in terms of payload efficiency. In this state, the air bag 6 is folded and contained inside the outer shell of the fuselage 1 or the main wing 2 and there is no obstruction in terms of air resistance.

In a usual flight, or immediately before, or immediately after, landing etc., if an emergency accident occurs in the air where a forced landing (including every unusual landing) is unavoidable due to inoperability of the airplane, malfunction of a main engine, etc., the pilot, will initiate an emergency operation for a forced landing and will direct the auxiliary engine 5 upwardly. Thereby, the airplane descending speed or sinking speed is sufficiently reduced and the airplane is landed on a planar area to the extent possible. If the emergency landing occurs in the night time, confirmation of the lay of the land is made by a flare bomb being dropped, etc. At this time, the air bag 6 is inflated in conjunction with the upward movement of the auxiliary engine 5 or by a separate selective operation (indication) of the pilot, and the airplane makes a so-called soft landing. The engine guard 5b is projected simultaneously with the expansion of the air bag 6 and the auxiliary engine 5 does not directly collide with the ground etc.

Thereafter, in compliance with an escape manual at the time of a forced landing, passengers and the crew can safely escape. But as the airplane makes a soft landing, except where there is a fear of fire due to fuel leakage or where the air in the room is not sufficiently ventilated even if the emergency door is opened, there is no urgent need for the people to exit the airplane. An escape chute is used for escaping from the airplane.

Figure 4:
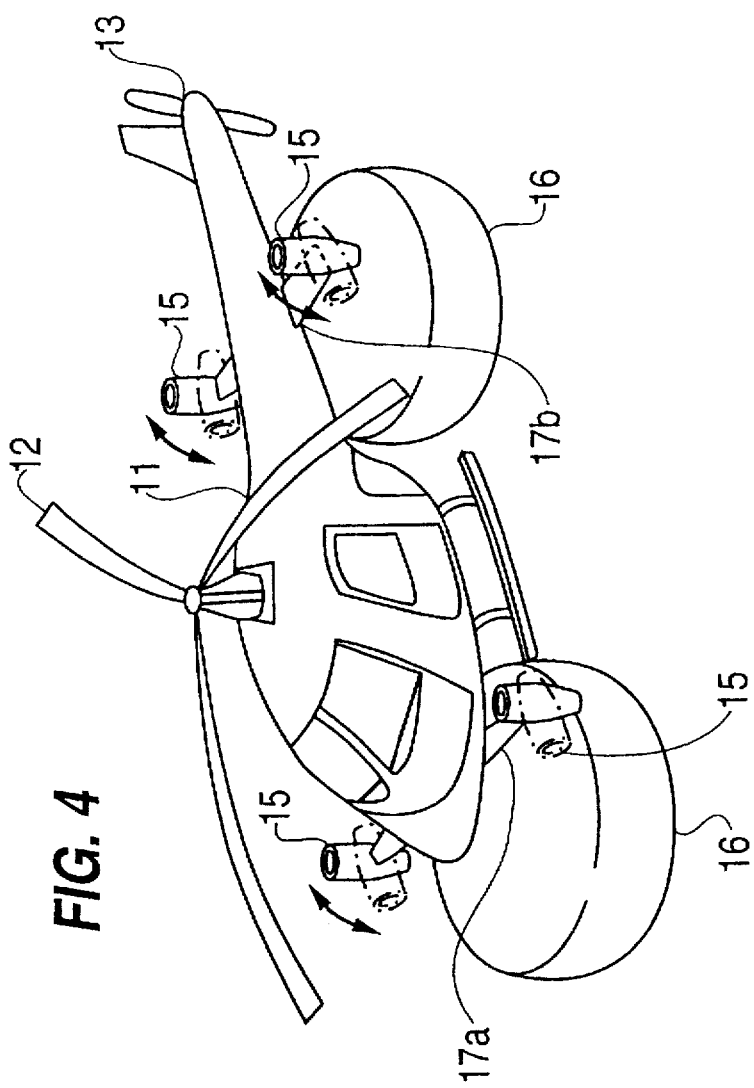
FIG. 4 is a perspective view of a helicopter equipped with a safety device of a second preferred embodiment according to the present invention.
Figure 5A:
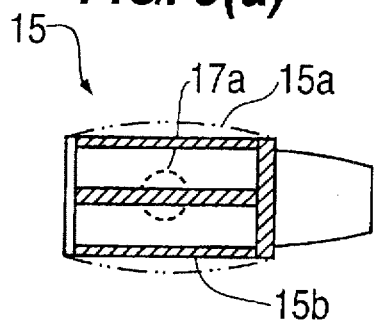
Figure 5B:
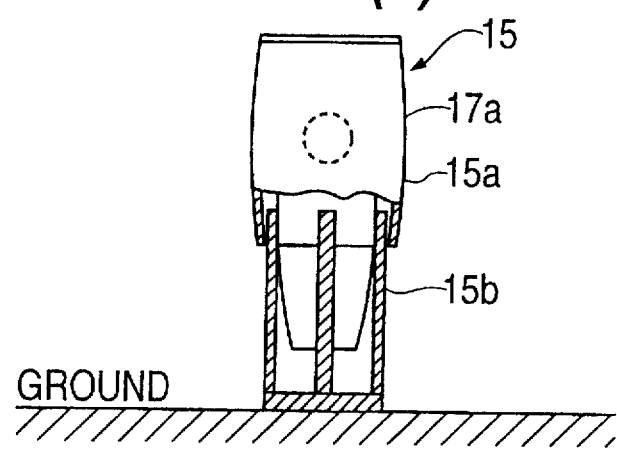

FIG. 4 is a perspective view of a helicopter with a safety device according to a second preferred embodiment of the present invention, and FIGS. 5(a)–(b) is an enlarged schematic side view showing an auxiliary engine 15 of FIG. 4. FIG. 5(a) shows a substantially horizontal state of the auxiliary engine 15 and an engine guard 15b is contained (a nacelle cover 15a is shown by two dotted and dash lines), and FIG. 15 (vertical direction) and the engine guard 15b in a projected position.

Incidentally, FIG. 4 shows an emergency landing, that is, a state where the auxiliary engine 15 is directed upwardly and the air bag 16 is inflated or expanded (projected). Also, arrows of FIG. 4 show that the auxiliary engine 15 is rotatable in the directions of the arrows in a range between the substantially horizontal direction and the substantially vertical direction. In the figure, the horizontal state (forward direction) of the auxiliary engine 15 is shown by double dot and dash lines.

In FIG. 4, numeral 11 designates a helicopter body, numeral 12 designates a rotor, numeral 13 designates a tail unit, and number 15 designates the auxiliary engine which, being rotatable around a right and left directional axis of the helicopter. The auxiliary engine is directed forwardly at the time of normal flight for reduction of air resistance and, in an emergency situation where a forced landing is unavoidable, the auxiliary engine rotates to the upward position and generates an upward thrust. Numeral 16 designates an air bag folded and contained inside the outer shell of the front lower portion or the rear lower portion of the helicopter body 11. An air inlet side of the air bag is connected to the helicopter body any further to a high pressure air bomb (not shown) which opens at an indication (operation) of a pilot in an emergency case so that the air bag is expanded like a flat ball as shown in the figure by the high pressure air and absorbs landing shock of the helicopter. Numeral 17a designates a front supporting member projecting symmetrically to the right or to the left from the front portion of the helicopter body 11 for rotatably and fixedly supporting the auxiliary engine 15 around the right and left directional axis (lateral axis), and numeral 17b designates a rear supporting member projecting to the right or to the left from the helicopter body for rotatably and fixedly supporting the rear auxiliary engines 15, offset a rotational moment generated by the upward thrust of the auxiliary engines 15 supported by the front supporting member 17a. The rear auxiliary engines 15 are rotatable about the right and left directional axis (lateral axis) serve themselves as stabilizers at the same time.

Incidentally, all of these components are symmetrically disposed right and left with respect to the helicopter body. In a case where the auxiliary engine 15 is to be directed horizontally so as to contribute to the forward thrust during normal flight, any of the front supporting member 17a and the rear supporting member 17b, appropriately selected, may be formed slightly longer so as to offset the plane spin (rotational reaction force) generated by the rotor 12. Even in this case, the vertical ascending moment is mostly offset and there occurs no large obstruction in an emergency case.

Next, in FIGS. 5(a)–5(b), numeral 15a designates a nacelle cover of auxiliary engine 15, and between the nacelle cover 15a and the auxiliary engine 15, a space is formed in which an engine guard 15b is projectably disposed. The engine guard 15b is used for shock absorption for protecting the upwardly directed auxiliary engine 15 from damage at the time of forced landing. A plurality of bar elements are disposed along the thrust axis of the auxiliary engine 15 and surround the auxiliary engine body 15. The engine guard is projectable in an axial direction, and the rear ends of the bar elements (the lower end side at the time of landing) are fixedly connected to an annular element. The engine 15b is usually contained between the nacelle cover 15a and the auxiliary engine body 15, and automatically responds to upward rotational movement of the auxiliary engine 15, or by a pilot operation immediately before landing, or automatically upon detecting a ground approaching effect such as an increase of backpressure against jetting pressure. The auxiliary engine guard projects beyond the tail end of the auxiliary engine 15, as shown in FIG. 5(b), and touches the ground and absorbs shocks by making elastic projecting and retracting. Thereby the auxiliary engine 15 will not touch the ground and is protected against damage.

The method of projection of the engine guard 15b can be taken, for example, from a compressed spring method in which a spring is inserted into a long and slender cylindrical element and a long bar element is inserted therein, a pneumatic method using a combination of a long and slender cylinder and a piston, or a rack and pinion method in which a rack is provided on the side of a bar element and a pinion to be rotated by an oil motor, reversely rotatable at a predetermined force, is provided on the side of the auxiliary engine 15. Whether the engine guard 15b is to be provided or not, however, is optional, and if there is no need to protect the auxiliary engine in an emergency case of a forced landing etc., the guard will not be necessary.

Next, the operation of the second preferred embodiment as so constructed is described.

At the time of normal flying, vertical ascending, hovering, etc. except in an emergency case situation, the auxiliary engine 15 is directed and fixed horizontally and is held in a non-operative state (provided that being directed horizontally and joining in forward flying or being directed vertically and joining in ascending or hovering is optional.

If an emergency event, such as when stoppage or breakage of the rotor 12, breakage of the tail unit 13, etc. occurs, the pilot initiates an emergency operation for a forced landing, and thus directs the auxiliary engine 15 upwardly and starts it. Thus, the loss of floating force of the helicopter due to stoppage of the rotor 12 is compensated and, if necessary, the inclination relative to the vertical axis and the thrust of each auxiliary engine 15, and thereby the sinking speed and attitude, can be controlled, and with the horizontal moving component being appropriately controlled, the helicopter can be directed to a desired place.

In case of breakage of the tail unit 13 (accordingly of the tail rotor), any one of the auxiliary engines 15, appropriately selected, is operated with the thrust axis being slightly inclined from the vertical direction so as to set off the plane spin generated by the rotor 12.

On the other hand, along with the operation to direct the auxiliary engine 15 upwardly, or independently thereof, the air bag 16 is actuated. An air bomb (not shown) is opened, the air bag 16 is expanded or inflated so as to project downwardly, and as shown in FIG. 4, it becomes like a large flat ball and absorbs landing shock. In other words, due to the sinking speed reduction of the helicopter by the upward thrust of the auxiliary engines 15 and the shock absorption provided by the air bag 16, the helicopter can make a remarkably soft landing, thereby saving human lives, and protecting the helicopter from further damage.

Incidentally, the air bag 16 is formed in a sufficiently flat shape and is provided at the central portion of the fitting positions of the front supporting member 17a and the rear supporting member 17b, respectively, thus the right and left directional moment of the helicopter is supported by the front supporting member 17a and the rear supporting member 17b and there will be no large inclination of the helicopter at the time of landing.

Naturally, in order for the high temperature jetting gas etc. of the auxiliary engine 15 not to damage the air bag 16, the auxiliary engine 15 is provided at a sufficiently outer location beyond the expansion diameter of the air bag 16. Incidentally, if the height of the air bag 16, as expanded, is made sufficiently high, there will be no need to provide the engine guard 15b.

At the containing portion of the air bag 16, a cover, which is easily detached downwardly by the expansion of the air bag 16 and forms the same flat face as the outer shell of the body, is provided. Since the helicopter does not fly at such a high speed as that of a fixed-wing aircraft, according to a convenience of maintenance or if there is no specific problem in the protection of the air bag 16 (especially protection from breakage by tools etc.), there will be no specific need to provide a cover to reduce air resistance.

In the first and the second preferred embodiments as mentioned above, examples in which the auxiliary engines 5, 15 make rotating movements in the forward and upward range within the vertical plane, parallel to the axis of the body, are described but the range of the rotating movement of the auxiliary engine 5, 15 is not limited thereto. If the connection portion to the supporting member, the supporting member, the supporting member 7 in the first preferred embodiment and the front supporting member 7a and the rear supporting member 7b in the second preferred embodiment, is constructed in a ball joint form or a universal joint form, the auxiliary engines 5, 15 may face in any given direction within the allowable range and be fixed at that direction, even if all the main engines stop and the operation system breaks down for example, the descending or the sinking direction can be changed by controlling the thrust direction of the auxiliary engines 5, 15 so that the aircraft can be led to a desired place in any direction and make a safe landing.

As mentioned above, according to the first and the second preferred embodiments of the present invention, as a soft landing during a forced landing can be made by use of auxiliary engine 5, 15, there is an advantage that human lives can be protected. Further, by use of the air bags 6, 16, there is an advantage that not only human lives but also the aircraft can make a landing without extensive damage.

Further, by use of the engine guards 5b, 15b, there is an advantage that not only human lives and the aircraft body but also the auxiliary engine 5, 15 can be protected, thus all of the human lives, the aircraft body, the auxiliary engine 5, 15 (naturally the main engine also, as being contained in the aircraft body) can be protected.

Still furthermore, by the air bags 6, 16 being provided at an appropriate place of the lower portion of the aircraft body 1, 11, in case of landing on the water, not only will the air bags 6, 16 absorb landing shock but they will also act as a floating body providing the advantage that a stable floatation of the aircraft can be maintained.

While a principle of the present invention has been described above in connection to preferred embodiments of the invention, it is intended that all matter contained in the above description and illustrated in the accompanying drawings shall be interpreted as illustrative rather than in a limiting sense.

What is claimed is:

1. An airplane having a safety device, said airplane comprising:

an airplane body;

a main wing extending from opposing sides of said airplane body;

a tail unit connected to an end of said airplane body;

at least two auxiliary engines movably mounted on a lower portion of said main wing so as to be symmetrically disposed with respect to a longitudinal axis of said airplane body, each of said auxiliary engines on said main wing having a thrust axis which can be variably positioned between a substantially horizontal direction and a substantially vertical direction;

at least two auxiliary engines movably mounted on a lower portion of said tail unit so as to be symmetrically disposed with respect to the longitudinal axis of said airplane body, each of said auxiliary engines on said tail unit having a thrust axis which can be variably positioned between a substantially horizontal direction and a substantially vertical direction;

first and second gas bags disposed, in a contracted state, at a lower portion of said airplane body; and third and fourth gas bags symmetrically disposed, relative to the longitudinal axis of said airplane body, in a contracted state along a lower portion of said main wing, wherein said first, second, third and fourth gas bags can each be instantly expanded into a spherical form in order to absorb landing shock in the event of an emergency landing.

2. The airplane as claimed in claim 1, wherein each of said auxiliary engines comprises an engine guard which is projectable in a direction along a central axis of said auxiliary engine to absorb landing shock.

3. The airplane as claimed in claim 2, wherein each of said engine guards comprises a plurality of bar elements disposed about the thrust axis and interconnected by an annular element.

4. A helicopter having a safety device, said helicopter comprising:

a helicopter body having a longitudinal axis;

a first pair of auxiliary engines symmetrically supported on a lower front portion of said helicopter body relative to the longitudinal axis of said helicopter body, each of said first pair of auxiliary engines having a thrust axis and being movably mounted so as to vary a thrust axis direction between a substantially horizontal direction and a substantially vertical direction;

a second pair of auxiliary engines symmetrically supported on a lower rear portion of said helicopter body relative to the longitudinal axis of said helicopter body, each of said second pair of auxiliary engines having a thrust axis and being movably mounted so as to vary a thrust axis direction between a substantially horizontal direction and a substantially vertical direction;

a first inflatable gas bag positioned, in a contracted state, at a lower front portion of said helicopter body; and a second inflatable gas bag positioned, in a contracted state, at a lower rear portion of said helicopter body, wherein said first and second gas bags can be instantly inflated into a spherical form in order to absorb landing shock in the event of an emergency landing.

5. The helicopter as claimed in claim 4, wherein each of said auxiliary engines comprises an engine guard which is projectable in a direction along a central axis of said auxiliary engine to absorb landing shock.

6. The helicopter as claimed in claim 5, wherein each of said engine guards comprises a plurality of bar elements disposed about the thrust axis and interconnected by an annular element.

* * * * *